Dec. 1, 1959    H. H. HILEMN    2,915,414
COPPER COATING PROCESS
Filed June 5, 1957
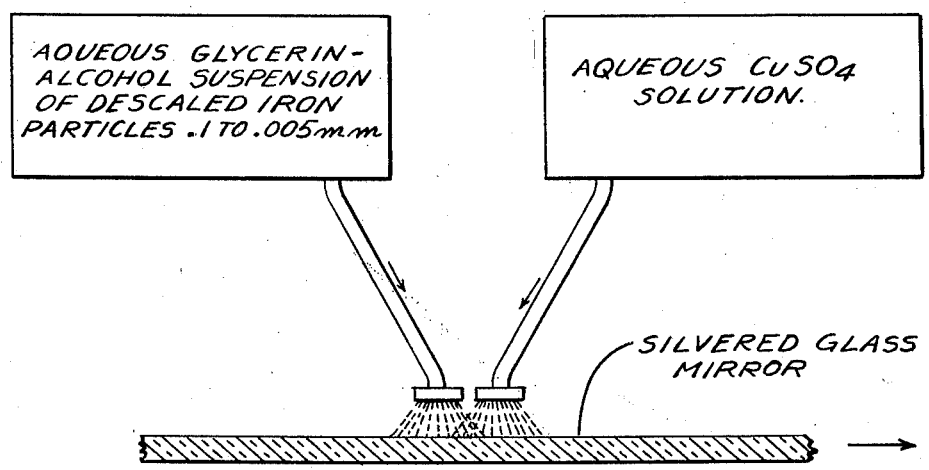
INVENTOR
HENRY H. HILEMN.
BY
ATTORNEY

United States Patent Office 2,915,414
Patented Dec. 1, 1959

2,915,414

COPPER COATING PROCESS

Henry H. Hilemn, Mount Vernon, N.Y.

Application June 5, 1957, Serial No. 663,598

5 Claims. (Cl. 117—35)

This invention relates to a method of producing a layer of copper on a silver surface, and more particularly to the production of a copper coating on the silver layer of a glass mirror.

An object of the invention is to provide a novel and improved method for precipitating the copper onto the silver coating.

Another object is to provide a novel and improved method of preparing iron particles for use in the precipitation of copper from a copper sulfate solution.

A further object is to provide a medium whereby the conditioned iron particles may be shipped to a distant point and used for the above purpose without further treatment.

Various other objects and advantages will be apparent as the nature of the invention is more fully disclosed.

In accordance with this invention copper is precipitated from a dilute aqueous solution of copper sulfate acidified with sulfuric acid so that it has a pH within the range of 0.8 to 1.2, by intimately mixing this solution with an aqueous suspension of conditioned finely divided iron particles.

The finely divided iron particles should have a particle size such that they can be sprayed without clogging the nozzle of the spraying equipment used for this purpose. In general particles having a maximum dimension not exceeding about 0.1 mm., preferably within the range of from 0.1 to 0.005 mm., will be found satisfactory.

The iron particles are prepared by first immersing the particles in a dilute acid bath such as a bath containing about 5% to 15% hydrochloric acid by weight, the concentration varying according to the condition of the iron particles being treated. The acid is then removed and the iron particles washed with water to eliminate as much free acid as possible. The washed particles are then washed with alcohol to neutralize any remaining acid that may be present.

The particles are then immersed in a slightly alkaline mixture of glycerin and alcohol, i.e. a mixture having a pH of about 7½ to 8½, using the minimum amount of mixture to completely cover the particles to avoid contact of the particles with air to prevent caking during periods of storing or shipping.

The acid treated iron particles immersed in glycerin may be shipped and stored for substantial periods of time and are ready for use when required without further treatment.

The mixture contains from 1 to 2 parts alcohol per part of glycerin. Use of methanol as the alcohol is preferred for reasons of economy, although other alcohols, such as ethanol, may be used. Sodium carbonate or other alkali may be used to impart the desired alkalinity to the iron particles. The resultant suspension of iron particles in the glycerin-alcohol mixture may have a concentration of iron particles of from 70% to 75%, of alcohol of from 12.5% to 15%, and of glycerin of from 12.5% to 15%, by volume. It remains as a free-flowing suspension during storage and shipment and when added to water to produce the suspension employed for precipitating the copper on the silver surface results in a suspension which will not plug the spray guns.

For the precipitation of copper sulfate solution the iron glycerin suspension is diluted with water to a concentration of 1.5 to 2 pounds of iron particles to about 40 gallons of water. This suspension is used with the copper sulfate solution hereinbelow described.

To produce the copper sulfate solution, copper sulfate of commerce may be used and dissolved in water to yield a solution containing about 6 to about 10, preferably about 8 ounces copper sulfate per gallon of water, i.e. having a concentration of about 5% to about 8%, of copper sulfate. To this solution is added enough sulfuric acid to give it a pH of about 0.8 to 1.6. If the pH of the solution is too high, i.e. above 1.2, not enough copper will deposit on the silver surface. If the pH of the solution is below 0.8, the deposit of the copper on the silver will invariably be hard and brittle and a satisfactory deposition of copper on the silver surface will not result.

In forming the copper coating, the copper sulfate solution having a pH of from 0.8 to 1.6 is contacted with approximately equal amounts of the suspension of iron particles hereinabove described at the point of deposition. The temperature at which the mixing is effected is desirably that of the surrounding atmosphere. Also it is desirable to agitate the copper sulfate solution; the suspension of iron particles should be agitated as it is fed to the spraying mechanism to maintain said solid particles uniformly distributed and suspended in the aqueous medium.

The invention may be utilized in the continuous production of silvered glass mirrors in which plates of glass in either vertical, horizontal or inclined position, preferably horizontal, are fed continuously under any well known silvering solution. As the production of such silver layer is well known further description thereof is unnecessary. In the continuous production of copper coated silver surface the copper is deposited on the silver while the silver layer is still wet. Thus, for example, the glass may pass continuously, being carried on a conveyor for this purpose, first through a station where the silver layer is applied and then to a station where the copper coating is applied. In accordance with this invention at the copper coating station one tank may be provided containing the copper sulfate having a pH of from 0.8 to 1.6 and a concentration of from about 0.1% to about 0.2% copper sulfate, and another tank containing the slurry or suspension of iron particles. The contents of both of these tanks may be agitated, say by means of a propeller type of agitator or by bubbling air through the tanks. In this way the solution and suspension sprayed remain uniform throughout the operation and settling of the suspended iron particles is avoided. The solution of copper sulfate and the suspension of iron particles are sprayed so that the sprays intermingle and the sprayed material mixes just before it deposits on the wet silver layer. As the coated glass moves from the copper coating station it passes through a station where a spray of water is played on the glass surface containing the copper coating. In this way excess copper sulfate and iron particles are removed. Thereafter the processed mirror passes through a drying station where a current of air is passed thereover effecting partial drying, and then passes through a heater, which may be in the form of a bank of infra red lamps, to complete the drying. From this drying treatment the mirror may be passed to a station where a transparent or opaque lacquer or other lacquer or paint coating is applied to the copper coating.

The above described procedure results in uniform homogenous, non-blotchy, non-porous and bright copper layers firmly adherent to the silver reflecting surface. The application of the solution of copper sulfate and finely divided iron particles is preferably carried out under a hood to remove whatever gas fumes may be generated.

A specific example of a method of preparing the iron particles follows:

Example

A finely divided iron (iron mesh of about three to four hundred) is descaled, pickled, or otherwise treated to remove any scale or oxidation that may be found present on the surface of the iron particles. It is necessary to have as much pure iron exposed on these particles as possible. Any oxidation, or scale, has a tendency to hinder the proper action of the iron when used as a reducer when it comes in contact with the copper solution. For this purpose the iron particles are descaled or pickled by immersion with agitation in a 5% to 20% acid solution. The acid used may be hydrochloric, nitric or sulfuric. After a short immersion at room temperature in this diluted acid solution, for a period of about five to ten minutes, the particles are allowed to settle so that the spent solution may be drained off. The particles are now immersed in plain water with agitation for approximately the same length of time at room temperature and again allowed to settle so that this water may be drained off. This washing operation is done to remove as much free acid as possible from the iron. Sometimes it is found necessary to repeat this washing a second or third time. A sufficient washing is determined by an acid test and carried to a point as near neutral as possible.

The surplus water is then drained off the particles and they are immersed in an alcohol bath, at room temperature, until an acid test shows a pH of slightly above 7.

The iron is now ready for use as a reducer for the copper. However, for storage and shipping purposes and better preservation during storage, the iron particles are immersed in a solution of alcohol and glycerin which has been neutralized to a point above 7 and thoroughly mixed with the iron particles. A sufficient amount of this solution is used so that when the mixture is bottled a little free solution shows at the top above the iron particles.

The accompanying drawing is a flow sheet diagram illustrating one embodiment of this invention. The legends on this flow sheet render it self-explanatory.

What is claimed is:

1. The process of depositing copper on a surface which comprises descaling finely divided iron particles with a dilute acid, removing the acid and immersing said particles in sufficient slightly alkaline mixture of glycerin and alcohol to completely cover the particles, adding water to said glycerin alcohol solution to form a suspension of said particles in a dilute aqueous glycerin alcohol solution, applying said suspension to said surface, simultaneously applying to said surface a copper sulfate solution and causing said suspension and said last solution to intermingle for thereby effecting reduction and deposition of copper from said copper sulfate solution on to said surface.

2. The process of depositing copper on a surface which comprises descaling finely divided iron particles with a dilute acid, removing the acid, washing said particles with water, neutralizing any remaining acid with alcohol, and immersing said particles in sufficient slightly alkaline mixture of glycerin and alcohol to completely cover the particles, adding water to said glycerin alcohol solution to form a suspension of said particles in a dilute aqueous glycerin alcohol solution, applying said suspension to said surface, simultaneously applying to said surface a copper sulfate solution and causing said suspension and said last solution to intermingle for thereby effecting reduction and deposition of copper from said copper sulfate solution on to said surface.

3. The method set forth in claim 2 wherein said suspension and said copper sulfate solution are applied to said surface in the form of independent sprays.

4. The method set forth in claim 2 in which said suspension contains 2% to 4% of said iron particles, said copper sulfate solution contains from 0.1% to 0.2% copper sulfate, and an amount of sulfuric acid to impart to said solution a pH of from 0.8 to 1.6.

5. A continuous method of producing silvered mirrors, which comprises continuously moving plates of glass, continuously applying to one side of each plate a silver salt and a reducing agent to form a silver surface on said plate, continuously applying to said silver surface while it is still wet a spray of aqueous copper sulfate solution having a pH of from 0.8 to 0.16, said solution having a concentration of approximately 0.1% to 0.2% copper sulfate, and a spray of a suspension of finely divided iron particles, which have been descaled by applying thereto a dilute acid and then removing the acid therefrom, in a slightly alkaline dilute aqueous glycerin/alcohol solution, said particles having a size within the range of 0.1 to 0.005 mm., said suspension having a concentration of about 2% to about 4% of said iron particles, causing said sprays to intermingle for thereby effecting reduction and deposition of copper from said copper sulfate solution on to said surface.

References Cited in the file of this patent

UNITED STATES PATENTS

| | | |
|---|---|---|
| 2,063,529 | Tainton et al. | Dec. 8, 1936 |
| 2,748,023 | Meth | May 29, 1956 |
| 2,759,845 | Hilemn | Aug. 21, 1956 |